United States Patent
Loh et al.

[11] Patent Number: 6,149,962
[45] Date of Patent: *Nov. 21, 2000

[54] GEL COMPOSITION METHOD OF MAKING AND PRODUCTS CONTAINING SAME

[75] Inventors: Jimbay P. Loh, Peekskill, N.Y.; Ramanathapur G. Krishnamurthy, Glenview; Daniel G. Lis, Wheeling, both of Ill.; Richard N. McArdle, Mahopac, N.Y.; Zohar M. Merchant, Wilmette; Lisa Anne Preston, Chicago, both of Ill.; Jerome F. Trumbetas, Tarrytown; Susan M. Vidal, Bedford, both of N.Y.; Vernon C. Witte, Naperville; James J. Myrick, Glencoe, both of Ill.

[73] Assignee: Kraft Foods, Inc., Northfield, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/807,055

[22] Filed: Feb. 27, 1997

Related U.S. Application Data

[60] Provisional application No. 06/013,218, Mar. 1, 1996.

[51] Int. Cl.[7] .................................................. A23L 1/05
[52] U.S. Cl. .................... 426/573; 426/578; 426/658; 426/804
[58] Field of Search ................................ 426/658, 573, 426/804, 578

[56] References Cited

U.S. PATENT DOCUMENTS

| | | | |
|---|---|---|---|
| H1229 | 9/1993 | McGinley et al. | 426/453 |
| 3,141,875 | 7/1964 | Battista et al. | 260/212 |
| 3,539,365 | 11/1970 | Durand et al. | 106/197 |
| 3,573,058 | 3/1971 | Tiemstra | 99/1 |
| 3,694,230 | 9/1972 | Cooke | 99/94 |
| 3,800,036 | 3/1974 | Gabby et al. | 426/164 |
| 4,199,368 | 4/1980 | McGinley | 106/197 |
| 4,263,334 | 4/1981 | McGinley | 426/573 |
| 4,374,702 | 2/1983 | Turbak et al. | 162/100 |
| 4,481,077 | 11/1984 | Herrick | 162/158 |
| 4,564,525 | 1/1986 | Mitchell et al. | 426/104 |
| 4,564,526 | 1/1986 | Mitchell et al. | 426/104 |
| 4,724,136 | 2/1988 | Scheibl | 424/50 |
| 4,758,515 | 7/1988 | Barwald et al. | 426/658 |
| 4,761,203 | 8/1988 | Vinson | 162/9 |
| 4,762,726 | 8/1988 | Soucie et al. | 426/656 |
| 4,865,863 | 9/1989 | Prosise et al. | 426/518 |
| 4,954,621 | 9/1990 | Masaoka et al. | 536/119 |
| 5,011,701 | 4/1991 | Baer et al. | 426/658 |
| 5,104,674 | 4/1992 | Chen et al. | 426/573 |
| 5,106,644 | 4/1992 | El-Nokaly | 426/603 |
| 5,127,956 | 7/1992 | Hansen et al. | 127/42 |
| 5,185,175 | 2/1993 | Loh et al. | 426/631 |
| 5,192,569 | 3/1993 | McGinley et al. | 426/96 |
| 5,209,942 | 5/1993 | Bauer et al. | 426/573 |
| 5,215,778 | 6/1993 | Davison et al. | 426/658 |
| 5,230,918 | 7/1993 | Anderson et al. | 426/572 |
| 5,238,698 | 8/1993 | Zumbé et al. | 426/572 |
| 5,254,174 | 10/1993 | Hansen et al. | 127/53 |
| 5,266,348 | 11/1993 | Zumbé et al. | 426/660 |
| 5,273,772 | 12/1993 | Cooper | 426/611 |
| 5,275,837 | 1/1994 | Eastman | 426/661 |
| 5,294,455 | 3/1994 | O'Brien et al. | 426/573 |
| 5,366,742 | 11/1994 | Tuason, Jr. et al. | 426/96 |
| 5,429,830 | 7/1995 | Janovsky et al. | 426/306 |
| 5,462,761 | 10/1995 | McGinley et al. | 426/573 |
| 5,468,512 | 11/1995 | Verschuren et al. | 426/658 |
| 5,501,869 | 3/1996 | Buliga et al. | 426/658 |
| 5,527,556 | 6/1996 | Frippial et al. | 426/573 |
| 5,542,513 | 8/1996 | Mallee et al. | 127/38 |
| 5,569,483 | 10/1996 | Timonen et al. | 426/658 |
| 5,614,243 | 3/1997 | Dunn et al. | 426/578 |
| 5,626,901 | 5/1997 | Ambjerg Pedersen | 426/589 |
| 5,769,934 | 6/1998 | Ha et al. | 106/162.8 |

FOREIGN PATENT DOCUMENTS 0664299  7/1995  European Pat. Off. .

OTHER PUBLICATIONS

Fennewa, "Food Chemistry", 3rd ed. p. 199, 1996.

*Primary Examiner*—Cynthia L. Nessler
*Attorney, Agent, or Firm*—Fitch, Even, Tabin & Flannery

[57] ABSTRACT

A gel composition of water, substantially linear polymeric monosaccharide and insoluble material exhibiting exceptional gel strength, thermal stability and organoleptic properties that may be utilized as a fat mimetic in food products. A preferred manufacturing method includes microparticulating the composition at elevated temperatures.

6 Claims, 3 Drawing Sheets

GEL COMPOSITION METHOD OF MAKING AND PRODUCTS CONTAINING SAME

RELATED APPLICATION

This application is based on, and claims benefit of, U.S. Provisional Application Serial No. 60/013,218, filed on Mar. 1, 1996.

BACKGROUND OF THE INVENTION

1. Field of the Invention

The present invention relates to composite food compositions comprised of substantially linear polymeric polysaccharides and insoluble, microparticulated material. The compositions are useful, inter alia, as a replacement for fat or oil in foods, and exhibit desirable viscosity characteristics and thermal stability as well as smooth, creamy organoleptic qualities. The present invention further pertains to methods of preparing the compositions and to products including food products such as dressings and sauces, containing the same.

2. Description of the Art

The replacement of fat and oil in foods has become an important dietary goal, with efforts being continually made to find fat mimetics which have improved properties, processability and/or that are more cost effective. Substantially linear polymeric monosaccharides such as inulin and maltodextrin have been used in low fat and fat-free food products. Inulin is a naturally occurring mixture of glucose-terminated polyfructoses which typically have a degree of polymerization (Dp) of from about 2 to about 80 or more fructose units joined mainly by beta-1,2-bonds. Maltodextrin is a 1,4 alpha linked polyglucose having a Dp of from about 2 to about 200. In general, commercial maltodextrin is made from controlled partial hydrolysis of starch. Depending on the condition and the degree of hydrolysis, commercial maltodextrin could vary in their DE (dextrose equivalent) from 0.5 to 50. The molecular weight distribution of commercial maltodextrin is normally narrower than that of commercial inulin.

Inulin and maltodextrin evidence certain behavior that has curtailed its usability as a fat replacement. For example, inulin, by itself, forms a desirable particle gel only at relatively high solution concentrations; that is, a minimum of 20–40% by weight of inulin is typically used for gelation in food products, which magnitude of concentration is not cost effective when large scale use is contemplated. In addition, the ability of inulin to gel in an appropriate manner may be reduced with exposure to temperatures above 50° C.; indeed, gelation may normally be compromised after exposure to temperatures above 80° C. Temperature sensitivity of gelation properties at such elevated temperatures effectively limits efficient pasteurization. The gel strength of inulin gels at desirable concentrations may also be generally less than desirable for many practical applications such as mayonnaise and other viscous food dressings, confections, low/no fat cream cheese, and process cheese. Inulin in its soluble form is prone to acid hydrolysis. This renders large scale use of inulin in acidic food products difficult (e.g., in mayonnaise, salad dressings, etc.). The above-mentioned problems are also true for maltodextrin of wide MW distribution but generally at less degree.

There is thus a recognized need for improvements in the use of polysaccharides as fat replacements.

SUMMARY OF THE INVENTION

The present invention relates to the combination of a substantially linear polymeric polysaccharides and an insoluble material to obtain a particle gel composition that manifests significantly improved viscosity or gel strength and thermal and acid stability. The compositions of the invention generally comprise water and a mixture of soluble polymeric saccharide of wide molecular weight distribution and insoluble material, the soluble polysaccharide being present in an amount of from about 10% to about 50% and preferably from about 15% to 45% by weight inulin and the insoluble material being present up to about 15% by weight based on the weight of the total composition. More specifically in this regard, when the polysaccharide is inulin, it has been found that when the mixture of inulin and insoluble material has a particle size distribution of from about 0.1 $\mu$m to about 50 $\mu$m, significant improvements in gel strength and thermal stability can be provided. The present invention also relates to aqueous inulin systems which provide relatively rapid and reliable development of viscosity and/or gel strength. The functional properties of the present invention (e.g., gel strength, thermal stability) is further enhanced by micromilling the composition at an elevated temperature (e.g., >80° C.)

DETAILED DESCRIPTION OF THE INVENTION

Figure 1:
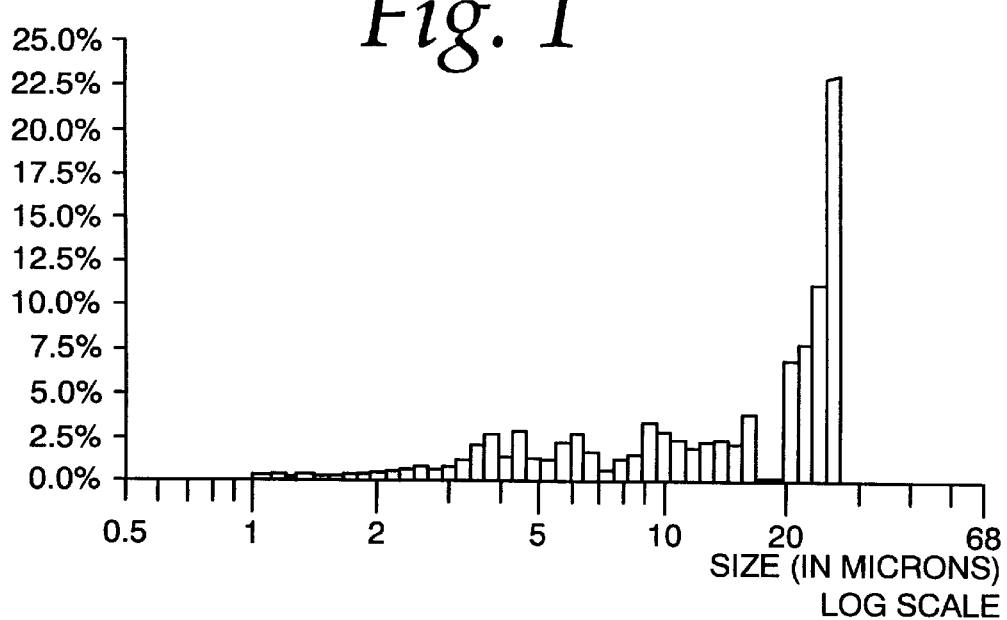
FIG. 1 graphically depicts the particle size distribution for a gel composition comprised of water, inulin (30% by weight) and wheat fiber (3% by weight) which are co-micromilled at 82° C.

In one aspect, the present invention is directed to aqueous phase compositions comprising water and an intimate mixture of inulin and edible insoluble material which is a dietary fiber, which is desirably at least partially microparticulated in the presence of the inulin. The composition contains about 10% to about 45% by weight inulin, and up to about 15% by weight fiber, based on the total weight of inulin, fiber and water of the gel composition. The fiber component is an important part of the composition, and will generally have a particle size distribution of from about 0.1 $\mu$m to about 50

μm, and preferably at least 80 weight percent of the edible fiber component will have a particle size in the range of from about 0.μm to about 10 μm. For use as a fat mimetic, the fiber component should best have a particle size (major dimension) of less than 5 μm. In a preferred practice employing co-micromilling, the inulin is present in the aqueous gel composition (before incorporation of the gel in a food product as a fat mimetic) at about 15% to about 40% by weight, and the fiber is present at about 1% to about 6% by weight; more preferably the inulin is present at about 20% to about 30% by weight, and the fiber is present in the range of from about 2% to about 4% by weight. Lower solids levels may desirably be used in high shear-impact microfragmentation processes. Use of higher fiber or other insoluble material levels may be appropriate when the material has low water holding capacity.

Percentages by weight as related in this specification are weight percent based on the total weight of the aqueous gel composition, unless otherwise indicated. The aqueous gel composition may be directly incorporated in other food products such as viscous dressing products, low/no fat dairy products such as fat free cream cheese and process cheese, to provide fat mimetic properties. Typically, from about 10% to about 70% by weight of the inulin-fiber gel composition will be incorporated in the finished food product, based on the total weight of the food product. Mixing with moderate shear may be needed for effective dispersion of the composition into the product. The aqueous inulin/microparticulated fiber compositions may also first be dried, such as by freeze-drying, spray drying or drum drying, to provide a fat mimetic component which may be rehydrated in the manufacture of fat-free and reduced fat food products. It may also be desirable to include a small amount (e.g., 0.5–2%) of an edible crosslinking agent such as succinic anhydride or sodium trimetaphosphate in the inulin-microparticulated gel before drying, in order to slightly crosslink the inulin, and/or bond inulin to the surface of the fiber particles. The drying step may be followed by vacuum treatment at elevated temperature over 110° C. if desired, to drive the esterification reaction forward.

The term inulin as employed in this specification includes mixtures of naturally-occurring polyfructoses having a degree of fructose polymerization (Dp) of about 2 to about 90 fructose units polymerized by beta-2,1-bonds. Inulin is a naturally-occurring, glucose-terminated polyfructose, as obtainable for example by aqueous extraction from plant sources such as Jerusalem artichokes, chicory, dahlias and dandelions. It is possible that non-inulin oligofructose polymers which are not glucose terminated, such as prepared by microbiological or enzymatic methods, may be processed as described herein to produce composite fiber-oligofructose compositions similar to inulin/fiber compositions described herein.

The term maltodextrin as employed in this specification includes one or more starch hydrolyzates comprising linear polyglucose polymers having a Dp ranging from 2 to about 200 (0.5 to 50 DE). A preferred maltodextrin is a mixture of maltodextrins such as a 10–40% mixture of DE 1, DE 5, DE 10 commercial maltodextrins with individual maltodextrin at a concentration of 10–35%, 1–15% and 1–10%, respectively, and preferably at 20–30%, 3–10-% and 1–5%, respectively. It is to be understood that the present invention contemplates mixtures of linear polysaccharides such as about 10% to about 50% inulin and about 10% to about 40% maltodextrin.

The microparticulated insoluble material such as an edible fiber is an important component of the fat mimetic compositions of present invention. It is desirable in accordance with the present disclosure that the surface area of the insoluble material component be increased by microfragmentation such as micromilling by a factor of from about 10 to about 100. Preferably, the surface area of the fiber component will be at least doubled, and more preferably, will be increased by a factor of at least 5 in the presence of the inulin component.

When an insoluble dietary fiber is used, it may be obtained from cereal, vegetable and fruit sources and includes bran-containing materials and cellulosic substances. Insoluble edible fiber can include in this regard wheat fiber, any form of cellulose including microcrystalline cellulose, α-cellulose, microporous cellulose, and microbial cellulose and oat fiber, soy fiber, tea leaf fibers (as a cellulose and tea tannin source), brewer's grain, other vegetable fiber such as psyllium husk fiber, oat bran, fruit fiber, chitin, tuber fiber (including the insoluble components of Jerusalem artichoke and chicory root from which the inulin may be obtained) and the like. The use of fiber materials such as oat bran and/or microparticulated chitin in the inulin-fiber compositions of this disclosure may provide inulin-fiber fat mimetic gels which provide health benefits to consumers, including cholesterol reduction. The edible fiber component may also comprise microparticulated spices such as mustard seed, paprika, sage, cinnamon, and/or fennel. Spice and flavor materials may facilitate encapsulating inulin precipitation which preserves and/or modifies flavor release in food products containing the composite material. Wheat fiber, microcrystalline cellulose and microbial cellulose are presently the most preferred edible fiber sources.

It is also contemplated to include as the insoluble microparticulated material inorganic materials such as food grade silica, silicates or titanium dioxide. The inorganic materials, prior to processing, desirably have a particle size of <100 μm. It is within the scope of the invention to utilize a mixture of insoluble dietary fiber or a mixture of organic and inorganic insoluble material at any ratio.

The particle size distribution of the inulin/fiber portion of the aqueous gel composition is from about 0.1 μm to about 40 μm at an ambient temperature of 25° C., a more preferred range being from about 0.8 μm to about 30 μm. Desirably, the edible insoluble microparticulated fiber component of the composition will have a particle size distribution such that at least 90 weight percent of the fiber particles will have a particle size in the range of from about 0.1 micron to about 10 microns in major dimension. The fiber or other insoluble material component may serve as nuclei for the crystallization of inulin in the solution. This size distribution can be obtained by conventional size reduction methods, including without limitation, micromilling, ball milling, and high-pressure impact shearing such as disclosed in U.S. Pat. No. 5,215,778 In a preferred practice, micromilling as disclosed in U.S. Pat. Nos. 5,185,175 and 4,761,203 of the polysaccharide together with the insoluble material is performed at elevated temperatures, e.g. over 50° C.; more preferably, micromilling is performed at a temperature between about 80° and about 100° C. In an even more preferred embodiment, inulin and insoluble dietary fiber are co-micromilled in an aqueous medium at a temperature of at least or above 82° C. Additional thermal treatment at 100° C. (e.g., 120° C.–150° C.) under pressure may be desirable for additional thermal/acid stability. Desirably, the fiber will be size-reduced in the presence of inulin and a small, but effective amount of an edible antioxidant material such as BHT, BHA, ascorbic acid, and/or tocopherol.

The micromilled composition is allowed to cool with slow, static refrigeration in bulk or rapid cooling with an appropriate heat exchanger.

In another aspect, the present invention is directed to a gel composition comprising water and a mixture of water soluble linear polysaccharide and microparticulated insoluble material processed together to provide a gel composition having a DSC peak at a transition temperature of about 75° to about 85° C. In a preferred embodiment, transition temperature is about 80° C.

In yet another embodiment, a gel composition is provided having a tempered DSC (to 120° C.), as described hereinafter, having at least two peaks, one at a transition temperature of about 65° to about 70° C. and the other at a transition temperature of about 85° to about 90° C.

Preferred gel compositions of the present invention manifest increased thermal stability in comparison to gel compositions made with inulin or maltodextrin alone. While not to be bound by any particular theory, it is postulated that the crystallization/gelation of dissolved inulin may be limited at the nucleation step by the degree of crystallinity or the number of pre-existing nuclei present in the inulin source material. If the inulin is more completely dissolved in aqueous solution at elevated temperature, the type of recrystallization may be affected upon cooling the solution. Desirable fat-mimetic gelation of conventional inulin solutions may be adversely affected by exposure to temperatures above 50° C., with greater effects on exposure to temperatures above 70° C. For example, an aqueous solution of inulin at 30% by weight may not gel effectively after heating to above 85° C. (U.S. Pat. No. 5,468,512), but may instead form relatively large crystalline precipitates at refrigeration temperatures. This will result in a gritty and objectionable mouthfeel in finished food products. Similar problems exist with maltodextrins including the formation of gels that have a gritty mouthfeel.

Gel compositions of the present invention can undergo gelation after exposure to temperatures over 50° C., including temperatures of 80° to 100° C. or more, which provides enhanced utility and functionality, including the capability for product pasteurization consistent with excellent fat-mimetic properties. Indeed, in a preferred practice of preparing gel compositions of the present invention, micromilling is performed at these higher temperatures. It is believed that the freshly exposed surface characteristics of the fiber particles used in the present invention, as obtained by co-micromilling the inulin and fiber components or as otherwise obtained, may function as seeds or nuclei which facilitate or allow the inulin to crystallize out of solution more efficiently and more completely in a desired form (i.e., small and stable inulin crystals) for providing fat mimetic characteristics, thus resulting in improvements in development of viscosity, gel strength, smoothness and acid/thermal stability.

Various aqueous inulin fiber composite gel compositions of the present invention further manifest significantly improved gel strengths in comparison with conventional inulin gels without edible microparticulated fiber components. For example, it is known that an aqueous gel comprising typical commercially available inulin in a 30% by weight aqueous suspension provides widely varying gel strengths, for example, between 30 and 200 g when measured by techniques as described in the Examples.

In contrast, gel compositions of the present invention may exhibit gel strengths of at least about 500 g for the same inulin material, including gel strengths of over 1000 g., e.g., about 1200 g.

The aqueous gel compositions of the present invention can be used as a full or partial replacement for fats or oils in food products such as mayonnaise or other viscous food dressings, pourable dressings, such as salad dressings, and process cheese. Organoleptically, gel compositions of the present invention provide a smooth, creamy texture and a mouthfeel similar to fat or oil, but given the use of substances such as inulin and insoluble fiber, are low in calories. Thus in another aspect, the present invention relates to a food product that comprises the subject gel composition. Such food products include, without limitation, spreads, dressings, creams, dairy products, sauces, processed meats, toppings and the like, the composition being used to replace some or all of the fat or oil otherwise found in such products.

The following examples are given to illustrate specific embodiments of the present invention, and are not to be interpreted as limiting the scope of the same since those of skill in the art will appreciate the modifications needed to facilitate broader practice.

EXAMPLE 1

A gel composition is prepared by co-micromilling inulin in aqueous solution at elevated temperature with insoluble wheat fiber.

A 30% by weight solution of a dry commercially-available food grade inulin (Cosucra Fibruline Instant, Belgium) was prepared with 80° C. water. The solution, at 80° C., is subjected to high shear mixing using a Lightnin Mixer until an opalescent solution formed. A commercially-available food grade dry wheat fiber (Watson White Wheat Fiber, Watson Foods Company, West Haven, Conn.) was added to the inulin solution until the final wheat fiber concentration was 3% by weight, to form an aqueous inulin-fiber slurry.

The slurry was then micromilled in a commercially-available wet ball mill grinder (Dynomill grinder of Glen Mills Inc., Maywood N.J.) as follows: the inulin/wheat fiber slurry was pumped through a horizontal chamber filled with ceramic (e.g., zirconium oxide) beads of 2.0–2.5 mm diameter. Micromilling occurred in this chamber using a rotating shaft speed of 3,600 rpm. The high shear and impact force of the beads pulverizes the inulin/wheat fiber particles in the inulin/wheat fiber slurry and the micromilled mass subsequently discharged through a gap opening in a separator for the beads. Grinding was performed at 82° C. and atmospheric pressure. A uniform and smooth paste was obtained after 2 passes through the mill.

The paste was then stored for 24 hours in a refrigerator at 32° F. to form a gel.

EXAMPLE 2

A gel composition was prepared using the procedure set forth in Example 1, except that the micromilling was performed at a temperature of 70° C., not 82° C. A uniform and smooth paste was again obtained after two passes through the mill. The paste was then stored for 24 hours in a refrigerator at 32° F. to form a gel.

EXAMPLE 3

An aqueous inulin gel composition without fiber is prepared as follows:

A 30% by weight solution of inulin was prepared with 80° C. water as set forth in Example 1. The solution was mixed at high speed in a Waring blender for 5 minutes to yield an opalescent solution at a temperature of slightly below 50° C. The mixture is then stored for 24 hours in a refrigerator at 32° to form a gel.

EXAMPLE 4

An aqueous inulin gel composition without fiber is prepared as follows:

A 30% by weight solution of inulin was prepared with 50° C. water as set forth in Example 1. The solution was mixed at high speed in a Waring blender for 5 minutes to yield an opalescent solution at a temperature of slightly below 50° C. The mixture is then stored for 24 hours in a refrigerator at 32° to form a gel.

EXAMPLE 5

A gel composition of water, inulin and fiber was prepared at elevated temperature without co-micromilling of the inulin and fiber, as follows:

A 30% by weight solution of inulin was prepared in water at 80° C. as described in Example 1. The solution was mixed at high speed using a Waring blender for 2–3 minutes after which wheat fiber as described in Example 1 is added until the final wheat fiber concentration is 4% by weight; mixing continued for 2–3 minutes to yield a slurry. The slurry was then stored for 24 hours in a refrigerator at 32° F. to form a gel.

EXAMPLE 6

The gel strength of the compositions of Examples 1–5 were tested as follows:

Gel strength for each of the gels of was measured using a TA-XT2 Texture Analyzer (Texture Technologies, Corp., Scarsdale N.Y.). The TA-XT2 was fitted with a 45 degree cone (TA-15) and was operated at a speed of 1 mm/sec and a penetration distance of 10 mm. The gel strength, in grams (g), for the compositions of each of Example 1–5 is given in the table below:

| Example | Sample | Gel Strength (g) |
|---|---|---|
| 1 | 30% Inulin with 3% Wheat Fiber Micromilled @ 82° C. | 1161 |
| 2 | 30% Inulin with 3% Wheat Fiber Micromilled @ 70° C. | 700 |
| 3 | 30% Inulin @ 80° C. solution temperature | <25 |
| 4 | 30% Inulin @ 50° C. solution temperature | 210 |
| 5 | 30% Inulin with 4% Wheat Fiber Unmilled @ 80° C. slurry temperature | <25 |

As can be seen from the table, the gel strengths of Examples 1 and 2, in which the inulin and edible insoluble fiber are co-micromilled at elevated temperature of at least 70° C., are significantly different than those of Examples 3 and 4, which are typical inulin and water gels.

It is noted that a comparison of Examples 3 and 4 indicate that subjecting an inulin solution to higher temperatures may result in decreased gel strength of the resulting inulin gel produced upon cooling the solution. In contrast, when the gel compositions of Examples 1 and 2 are processed at higher temperatures during co-micromilling of the inulin together with the fiber, gel strength increases (from 700 g @ 70° C. to 1161 g @ 82° C.), which behavior is wholly unpredicted from the typical gel systems. In comparison of Examples 1 and 5, it appears that co-milling of inulin and fiber is important in producing the relatively large increase in gel strength. Simple addition of fiber without the co-micromilling step did not yield the desirable effect.

EXAMPLE 7

The particle size distribution of a gel composition made in accordance with Example 1 was determined by re-dispersing the slurry portion in cold water followed by analysis using a Brinkman Particle Size Analyzer. The results are shown in FIG. 1. Volume-average mean particle size was determined to be 15 $\mu$m which is due mainly to the wheat fiber component. The uniform size of the inulin crystals was estimated at 1–2 $\mu$m by direct microscopic examination.

EXAMPLE 8

Figure 2:
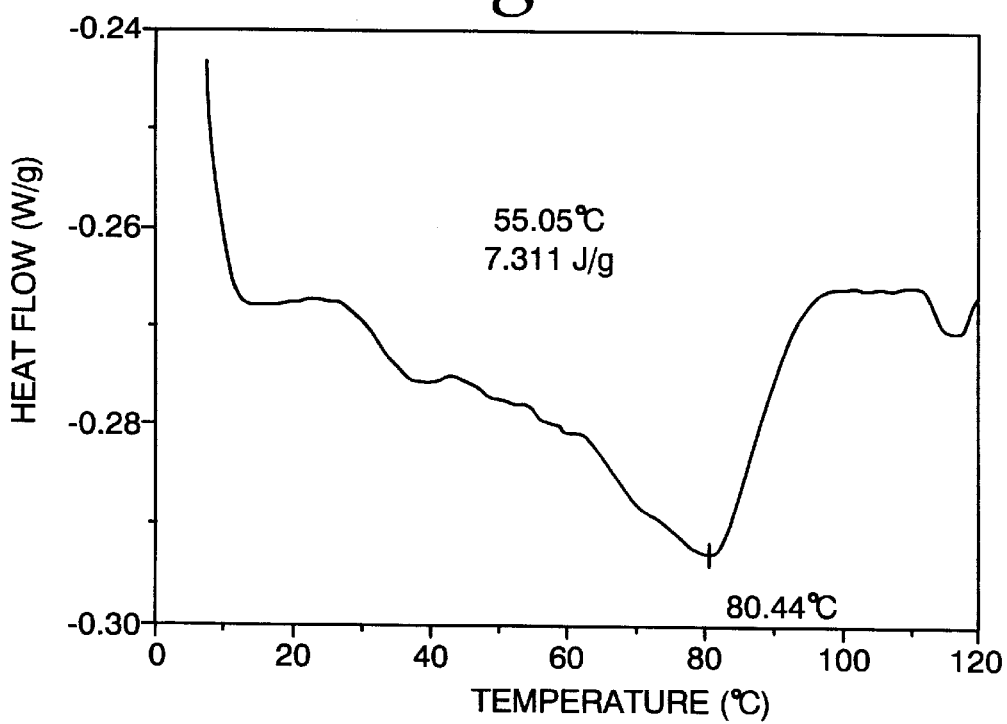
FIG. 2 is the DSC spectrum for a gel composition comprised of water, inulin (30% by weight) and wheat fiber (3% by weight) which are co-micromilled at 82° C.
Figure 3:
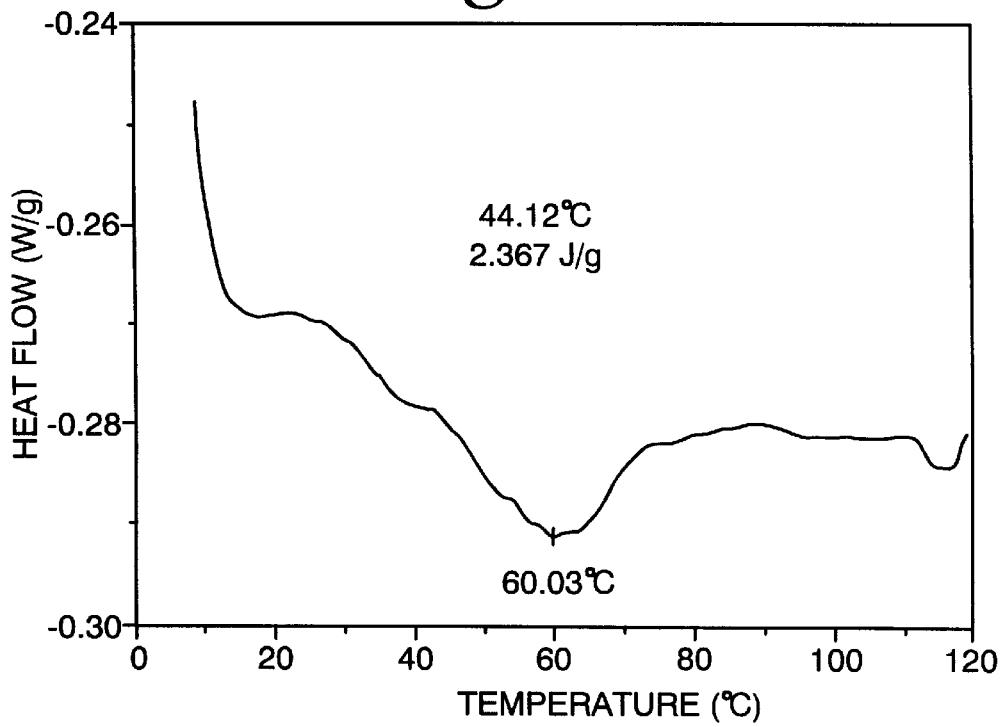
FIG. 3 is the DSC spectrum for a typical conventional inulin (30% by weight) in the form of a water gel prepared with 80° C. water.

Differential Scanning calorimeter ("DSC") spectra for gel compositions prepared in accordance with Example 1 and Example 3, were obtained using a differential scanning calorimeter made by TA-instrument (formerly DuPont) model 912-D5-DSC, New Castle, Del. The DSC curve for the gel of Example 1 is shown at FIG. 2; the DSC for the gel of Example 3 is shown at FIG. 3. As can be seen, the gel composition of Example 1 has a partial transition temperature significantly higher than that for the aqueous inulin gel of Example 3. The DSC for Example 1 shows a partial transition temperature of about 80° C. whereas that for Example 3 is about 60° C. The difference indicates superior thermal stability of the gel of Example 1, resulting from its having been heated to a temperature above 80° C. or more.

EXAMPLE 9

Figure 4:
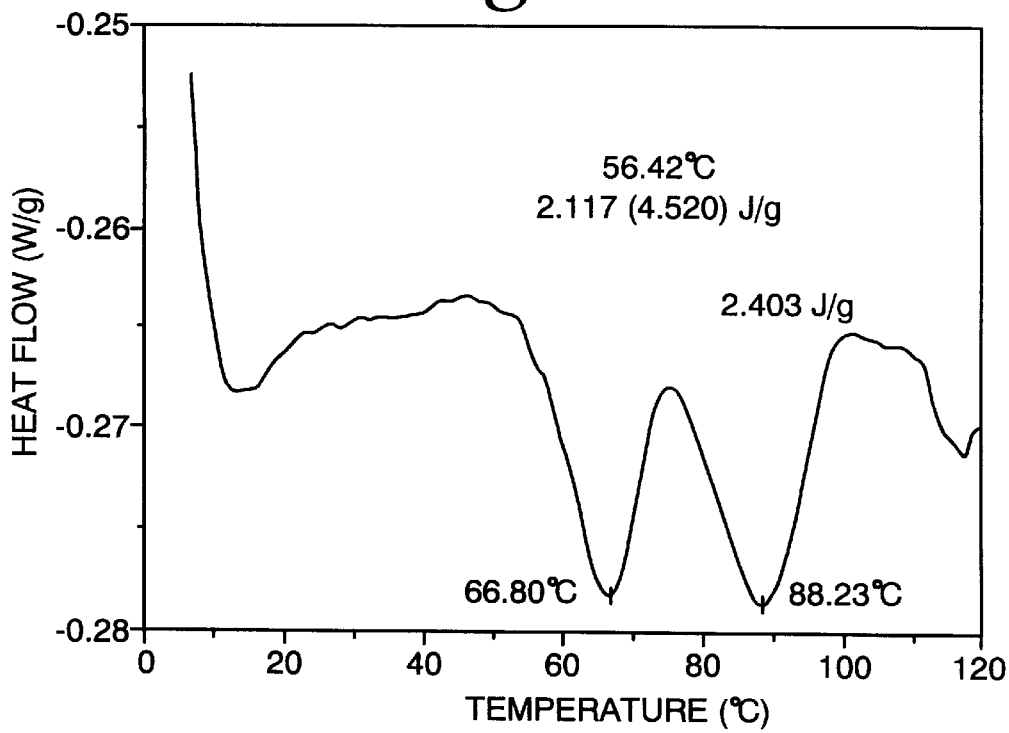
FIG. 4 is the tempered DSC spectrum for a gel composition comprised of inulin (30% by weight) and wheat fiber (3% by weight) which are co-micromilled at 82° C. Tempering was performed by heating the resultant gel to 120° C. followed by controlled cooling.

A tempered DSC spectrum for a gel composition prepared in accordance with Example 1 was obtained by heating the resultant gel to 120° C. followed by controlled cooling. The DSC shown at FIG. 4, showed two distinct transition temperatures, one at 66.80° C., the other at 88.23 C. The presence of two distinct peaks at these elevated temperatures indicates the production of relatively stable crystal species or morphology for use in food products which may be heated or pasteurized. These peaks are thermally reversible, indicating reliable and consistent functional property development in food product use and manufacture.

EXAMPLE 10

An aqueous inulin-wheat fiber gel product is prepared by co-micromilling wheat fiber with inulin in water in a wet ball mill in a manner similar to Example 1, without using elevated co-micromilling temperatures above 70° C., according to the following procedure:

1) Prepare a 33% inulin solution in water using a bench scale Hobart mixer.

2) Allow slurry to mix for 2–3 minutes.

3) Add wheat fiber to slurry until the final wheat fiber concentration is 3.5%.

4) Transfer slurry to feed bucket.

5) Pump inulin/wheat flour slurry through micromill at ambient temperature of about 50° C. to 60° C.

6) Begin collecting product when a thick, homogeneous stream exists the mill.

Results: Micromilling these ingredients produced a very smooth material with shortening-like properties. The micromilled material had a very high viscosity similar to baking shortening. It spooned and handled like a shortening. Mouthfeel was very good smooth and creamy.

A sample of the product is evaluated on a Horiba (LA-900) particle data analyzer with a range of 0.04–1000 microns. The result of the measurement analysis is a volume distribution characterization. Results expressed in the table below are expressed in microns (μm).

|  |  | INULIN WHEAT FIBER | |
| --- | --- | --- | --- |
| DIAM/PERCENTILE | | MVD | MVSD |
| 10% | 15.70 | 71.34 | 32.55 |
| 30% | 31.83 | | |
| 50% | 48.18 | | |
| 70% | 72.17 | | |
| 90% | 137.36 | | |

Figure 5:
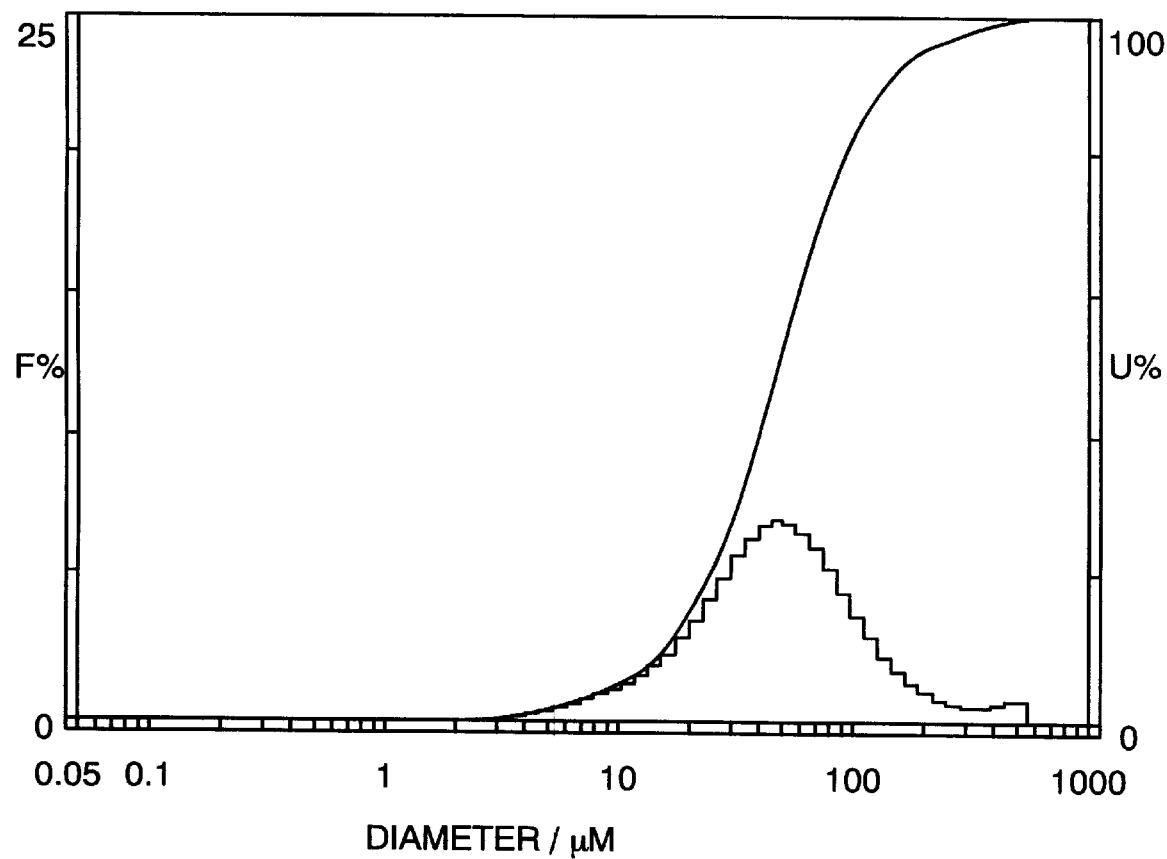
FIG. 5 is a graphical representation of the particle size distribution of an aqueous inulin-wheat fiber composition which has been co-micromilled at a temperature of about 50° C. to 60° C. The data of FIG. 5 was obtained under the following conditions: Conditions of measurement: agitation speed 1; U-Sonic work time 0 min; Sampling times 15; Circulation speed 3; Waiting time after U-Sonic 0 sec; Form of Distribution 1; R.Refractive index 1.04–0.00i; Distribution base volume. Data: median diameter 48.176 ($\mu$m); Specific surface area 1843 cm2/cm3; Standard deviation 81.199 ($\mu$m); diameter on: [1] 10.0%=15.699 $\mu$m; [2] 30.0%=31.834 $\mu$m; [3] 50.0%=48.176 $\mu$m; [4] 70.0%=72.174 $\mu$m; [5] 90.0%=137.356 $\mu$m; % on Diameter 1000.00 $\mu$m=100.0%; transmittance (LASER)=94.1%; transmittance (LAMP)=95.0%.

A histogram chart of the particle data is shown in FIG. 5.

A 30% inulin+ 3.5% wheat fiber material is similarly prepared as described above, for preparation of fat-free viscous dressing product of the mayonnaise type, prepared from a starch base and prepared flavor emulsion (oil+egg). In accordance with the following:

|  | Sample # | |
| --- | --- | --- |
|  | 1 (%) | 2 (%) |
| Starch Base | 46 | 46 |
| Micromilled Inulin-Wheat Fiber | 33 | 38 |
| 120 Gr Vinegar | 1.9 | 1.9 |
| Emulsion Conc. | 4.05 | 4.05 |
| Water | 15.05 | 10.05 |

EXAMPLE 11

An inulin-wheat fiber, high temperature composite sample is prepared by co-micromilling the inulin and the wheat fiber at an elevated temperature in accordance with the process of Example 1, to produce a gelled composite fat mimetic product which is 30% inulin, 3% wheat fiber and 67% by weight water. This inulin/fiber composite gel is incorporated into a viscous dressing product comprising flavor components and a standard aqueous starch base material such as used in oil-containing viscous dressings. The starch Base is a different starch base than that of Example 10, having a higher level of sugar, which adds an increased level of sweetness in comparison to the starch base of Example 10: Formula

|  | % |
| --- | --- |
| Aqueous Starch Base | 46 |
| Micromilled Inulin-Wheat Fiber Gel Composition | 33 |
| 120 Gr Vinegar | 1.9 |
| Flavor & Emulsifier Concentrate | 4.05 |
| Water | 15.05 |

Because of the thickness and density of the inulin-fiber material, an Oakes mixer is used to produce a mild-heavy shearing action to disperse the micromilled inulin-wheat fiber component with the other components. The formula is weighed, prepared by hand mixing with a spatula and charged to the Oakes mixer to produce a material which is very smooth and well blended. The mixture was passed through the Oakes mixer a second time to insure smoothness and complete dispersion. The sample (5803-154-1) is then collected in a jar and a number of Brookfield viscosity measurements are taken, which are averaged to provide a viscosity measurement, as follows:

Viscosity Data

Brookfield (model-11+, T-C spindle, 20 rpm with helipath), viscosity readings (in cps) taken immediately after micromilling (zero time), one hour, four hours, and one day after preparation are, respectively, 19,300, 20,300, 24,500 and 25,000.

EXAMPLE 12

To permit direct comparison of a viscous food product containing the inulin-wheat fiber gel of Example 10 prepared at "low" temperature (e.g., <45° C.), with a viscous food product prepared with the "high" temperature (e.g., >80°C.) inulin-wheat fiber gel of Example 11 prepared at, the Example 10 inulin-wheat fiber gel is also reevaluated using the viscous product formulation system of Example 11.

A viscous food product sample is prepared by blending the micromilled inulin-wheat fiber gel material of Example 10 with the starch base material of Example 11, using the Oakes mixer as described in Example 11, in accordance with the following formula: Formula

|  | % |
| --- | --- |
| Aqueous Starch Base | 46 |
| Micromilled Inulin-Wheat Fiber Gel Composition | 33 |
| 120 Gr Vinegar | 1.9 |
| Flavor & Emulsifier Concentrate | 4.05 |
| Water | 15.05 |

This sample was less thick in processing through the Oakes mixer than the sample of Example 11. Viscosity measurements are taken as described in Example 11, as follows:

Viscosity

Brookfield viscosity readings (in cps) taken immediately after micromilling (zero time), one hour, four hours and one day after preparation are, respectively, 15,600, 17550, 22,450 and 25,250.

Both samples had a smooth creamy mouthfeel. Both materials produce a creamy unctuous sensation in the mouth.

For reference, the Brookfield viscosity of a conventional mayonnaise and a fat-free mayonnaise were measured at 38,500 and 23,350, respectively.

The immediate (0-Time) viscosity measurements demonstrate that the high temperature inulin-fiber material of Example 11 produces higher initial viscosity (more rapid processing set), in a viscous product than the low-temperature inulin-fiber material of Example 12. The 4 hour data and one day data indicate that the low temperature co-micromilled material may over time produce a dressing viscosity similar to that of dressing using the high temperature micromilled inulin-wheat fiber. It should be noted, however, that the "low temperature" material had 3.5% wheat fiber, whereas the "high temperature" material had only 3% wheat fiber:

|  | 0 Time | 1 Hour | 4 Hours | 1 Day |
| --- | --- | --- | --- | --- |
| High Temperature | 19,300 | 20,300 | 24,500 | 25,000 |
| Low Temperature | 15,600 | 17,550 | 24,450 | 25,250 |

The data demonstrates that high temperature micromilled composition is superior to low temperature micromilled material in the following manner: (1) more rapid setting, a desirable characteristic allowing shorter hold time prior to the release of the product for shipping, and (2) higher viscosity, representing potential quality improvement or cost savings.

EXAMPLE 13

A 25% maltodextrin solution was prepared containing 18.5% DE 1 maltodextrin, 5.75% DE 5 maltodextrin, 0.75% DE 10 maltodextrin and 75 water.

Two samples were prepared. Sample A comprised the maltodextrin solution as described alone. Sample B comprised an aqueous solution containing 25% of the identical mix of maltodextrins of Sample A, 3% wheat fiber and 72% water. Sample B was microparticulated by micromilling in a high efficiency ball mill (Dynomill Model KDL1.4L@3600 rpm) at 85° C.

The gel strengths of Samples A & B. measured in accordance with the procedure of Example 6, were as follows:

|  | Day 1 | Day 7 |
| --- | --- | --- |
| Sample A | 0 | 205 |
| Sample B | 36 | 355 |

What is claimed is:

1. A method for the manufacture of a gel composition, said method (1) comprising preparing an aqueous mixture consisting essentially of about 30% to about 35% by weight of a substantially linear polysaccharide, up to about 3 to about 4% by weight of an insoluble material, and water and (2) co-microparticulating said aqueous mixture to provide a particle size distribution of from about 0.1 $\mu$m to about 50 $\mu$m, wherein said polysaccharide is inulin and said insoluble material is wheat fiber, wherein said co-microparticulating is carried out by micromilling said aqueous mixture at a temperature of from about 115 C. to about 125 C.

2. A gel composition comprising water and a mixture consisting essentially of substantially linear polymeric polysaccharide and insoluble material, wherein said polysaccharide is inulin and wherein said insoluble material is insoluble fiber, said inulin being present at about 15 to about 45% by weight, said insoluble fiber being present at up to about 15% by weight in said composition, said mixture having a particle size distribution of from about 0.1 $\mu$m to about 50 $\mu$m derived by co-microparticulating said mixture of said inulin and said insoluble fiber, and wherein the insoluble fiber is selected from wheat fiber, articulated microbial cellulose, oat fiber, soy fiber, brewer's grain, vegetable fiber, chitin, fruit fiber, seasoning fiber, and mixtures thereof.

3. The composition of claim 1 wherein said inulin is present at about 15 to about 40% by weight and said fiber is present at about 1 to about 6% by weight.

4. The composition of claim 2 wherein said inulin is present at about 20 to about 30% by weight and said fiber is present at about 3 to about 4% by weight.

5. The composition of claim 4 wherein said fiber is wheat fiber and said particle size distribution is from about 0.8 $\mu$m to about 30 $\mu$m.

6. A gel composition comprising water and a mixture consisting essentially of inulin and insoluble fiber, said inulin and said fiber being co-microparticulated and said inulin and said fiber each being present in an amount and said mixture having a size distribution to provide a tempered DSC spectrum for said composition having two peaks at transition temperatures of about 65 to about 70° C. and at about 85 to about 90° C., respectively.

* * * * *